United States Patent [19]

Klee

[11] Patent Number: 4,866,946

[45] Date of Patent: Sep. 19, 1989

[54] SPIRAL CRYOGENIC FREEZER

[75] Inventor: David J. Klee, Emmaus, Pa.

[73] Assignee: Air Products and Chemicals, Inc., Allentown, Pa.

[21] Appl. No.: 229,084

[22] Filed: Aug. 5, 1988

[51] Int. Cl.$^4$ ............................................. F25D 13/06
[52] U.S. Cl. .......................................... 62/63; 62/266; 62/381
[58] Field of Search ............................ 62/266, 381, 63

[56] References Cited

U.S. PATENT DOCUMENTS

| | | | |
|---|---|---|---|
| 3,728,869 | 4/1973 | Schmidt | 62/266 |
| 4,023,381 | 5/1977 | Onodera | 62/381 |
| 4,078,394 | 3/1978 | Chamberlain | 62/203 |
| 4,103,507 | 8/1978 | Benois | 62/63 |
| 4,103,768 | 8/1978 | Perrson | 198/778 |
| 4,164,129 | 8/1979 | Stueber | 62/326 |
| 4,229,947 | 10/1980 | Klee | 62/374 |
| 4,271,683 | 6/1981 | Williams | 62/374 |
| 4,324,110 | 4/1982 | Lovette, Jr. et al. | 62/381 |
| 4,356,707 | 11/1982 | Tyree, Jr. et al. | 62/381 |
| 4,739,623 | 4/1988 | Tyree, Jr. et al. | 62/63 |

Primary Examiner—Ronald C. Capossela
Attorney, Agent, or Firm—James C. Simmons; William F. Marsh

[57] ABSTRACT

A method and apparatus for controlling movement of the refrigerated atmosphere (e.g. gaseous cryogen) contained inside the insulated chamber of a spiral type freezer out of, or ambient atmosphere into, the lower opening of the freezer by establishing a positive pressure of ambient atmosphere adjacent the inlet opening of the freezer.

11 Claims, 2 Drawing Sheets

SPIRAL CRYOGENIC FREEZER

TECHNICAL FIELD

The present invention pertains to cryogenic cooling devices and more particularly to such devices which employ a liquid cryogen to cool and freeze product disposed on a conveyor belt moving through an insulated chamber.

BACKGROUND OF THE INVENTION

Cryogenic freezers have been used for many years to rapidly cool and freeze various articles such as food on a continuous basis.

Cryogenic freezers come in many forms, one being the tunnel-type freezer, which is adequately described in U.S. Pat. No. 4,229,947. The tunnel-type freezers can employ various cryogens, among them liquid nitrogen, liquid carbon dioxide and liquid air.

Another type of cryogenic food freezer is the spiral food freezer named because the conveyor belt is arranged in either an ascending or descending spiral path within an enclosure. Examples of this type freezer are disclosed in U.S. Pat. Nos. 4,023,381; 4,078,394; 4,103,507; 4,103,768; 4,164,129; 4,271,683; 4,324,110 and 4,356,707. In the ascending type freezer the product is introduced through a lower opening in the chamber and conducted along the spiral conveyor in a helical path to an exit disposed near the top of the insulated housing or chamber.

Existing cryogenic spiral freezers have no method to prevent the loss of cold gas from the lower opening. Some cryogenic spiral freezers incorporate a flexible curtain at the lower opening in an attempt to reduce this loss of refrigeration. However, the flexible curtains can reduce, but can not eliminate this loss. The flexible curtains are not durable and are easily damaged. Further, the flexible curtain can interfere with food products placed on the conveyor belt.

The conventional spiral freezers have a further disadvantage when production is interrupted, such as during a lunch break. To maintain the operating temperature, the flow of cryogenic fluid injected into the freezer is reduced to about 8% of the normal flow. Under these conditions the flow out of the lower opening is much greater than the volume of cryogenic fluid vaporized within the freezer. As a result, warm room air will flow into the upper opening. The water vapor contained in the room air condenses and freezes causing an accumulation of frost and ice within the freezer, as well as a significant heat input into the freezer.

In operation when the insulated enclosure of the spiral freezer is at operating temperature, because of the vertical distance between the openings of the freezer, cold dense gas inside the enclosure will spill out of the lower opening causing a significant loss of refrigeration.

The existing spiral freezers employing liquefied carbon dioxide as the cryogen lose the most significant amount of refrigeration from the cold gas spilling out of the lower opening because of the greater density of gaseous carbon dioxide. However, these spiral freezers have an oversize exhaust fan with an exhaust hood at the lower opening to prevent the carbon dioxide gas from accumulating in the processing room. Thus, the exhaust hood prevents the freezer operator from observing the loss of cold gas.

One attempt at solving this serious problem is disclosed in U.S. Pat. No. 4,739,623. The apparatus shown in the '623 patent attempts, by creating a negative pressure inside of the cabinet, to prevent egress of cryogen from the cabinet or ingress of ambient air into the cabinet through the inlet opening. The problem with the freezer of the '623 patent resides in the fact that since a sensor or thermocouple is placed in the exhaust hood disposed adjacent the inlet opening of the freezer, there is not a good signal for control because the temperature range of operation is very small since only a small amount of cryogen mixes with a large amount of ambient air to create a detectable condition for control. In addition, the apparatus of the '623 patent uses a pair of slideable gates in conjunction with the openings and baffles to create an effective control system. The gates must be positioned manually in order to balance and control conditions inside of the cabinet.

SUMMARY OF THE INVENTION

In order to overcome the problem with prior art devices and to provide an effective method and apparatus for preventing egress of contained refrigerated atmosphere (e.g. cryogen) from a spiral-type freezer cabinet and ingress of ambient air into the spiral freezer cabinet through the lower opening, ambient air adjacent the lower opening is pressurized by creating a pressure chamber in that location. A temperature sensor placed within the lower opening of the freezer detects movement of cryogen out of the freezer or ambient air into the freezer, and thus can be used to control a pressurizing fan connected to the pressurizing chamber so that zero flow through the lower opening of the freezer is achieved.

DETAILED DESCRIPTION OF THE PREFERRED EMBODIMENT

Figure 1:
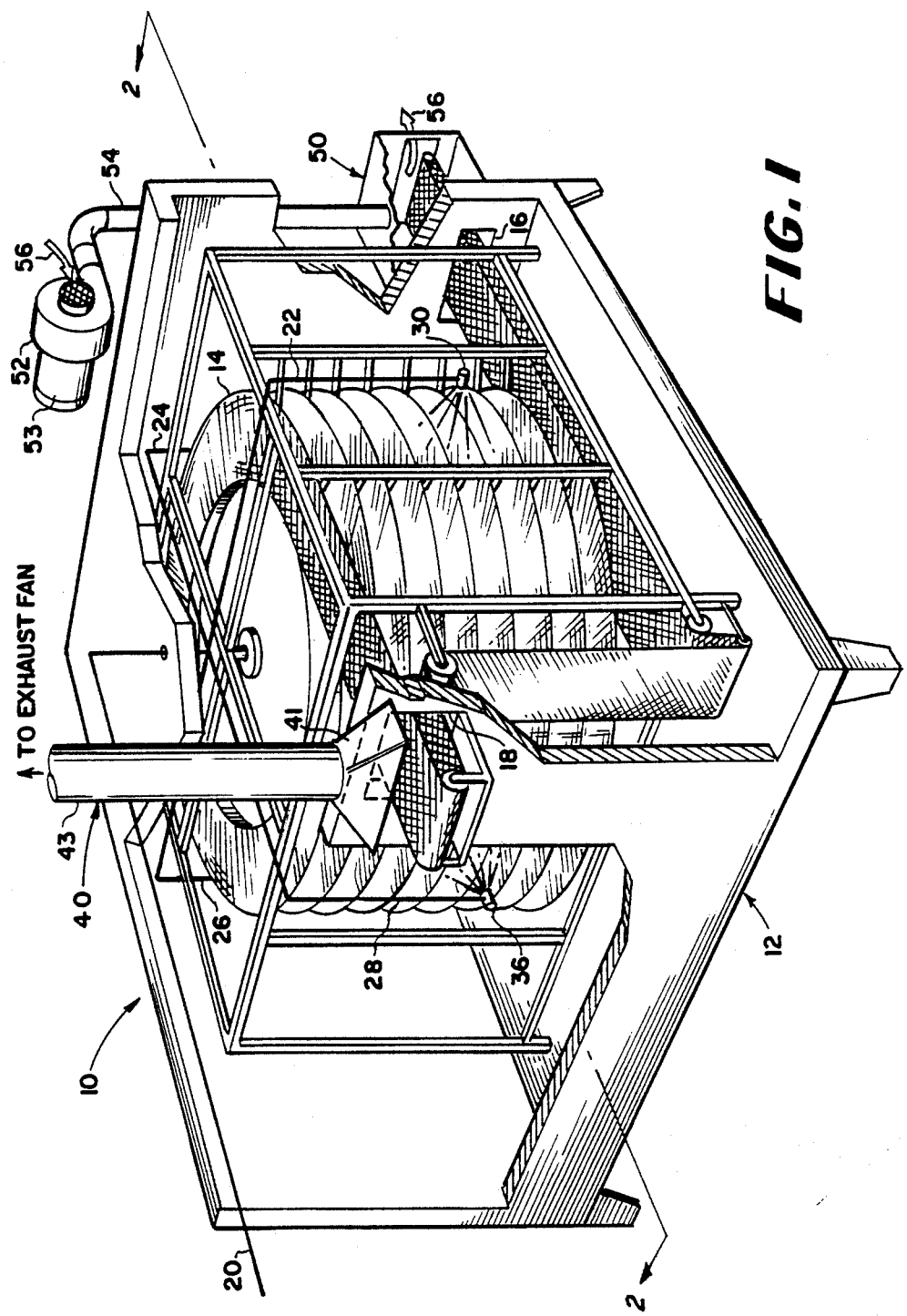
FIG. 1 is a perspective view, with portions broken away for clarity, illustrating a spiral cryogenic freezer according to the present invention.

Referring to FIG. 1, the numeral 10 shows a spiral cryogenic freezer 10 according to the present invention. Freezer 10 includes an outer housing or cabinet 12 having disposed therein a conveyor system 14 which is arranged to conduct a product to be frozen from an inlet or lower opening 16 to an outlet or upper opening 18 of the freezer 10. It is to be understood that the present invention is being described in relation to freezer 10 wherein the conveyor system 14 runs in a direction to carry the product to be frozen from the lower opening 16 to the upper opening 18. However it is possible, and many users of spiral freezers do, run the conveyor system 14 in the reverse direction so that the upper opening 18 is the inlet and the lower opening 16 is the outlet. Conveyor 14 is arranged in an ascending spiral path within the cabinet 12 to accomplish the movement of the product from the inlet (lower opening) 16 to the outlet (upper opening) 18 of the freezer 10. One example of a suitable conveyor 14 is the Lotension Spiralcage System developed by Ashworth Brothers, Inc. of Winchester, VA.

Figure 2:
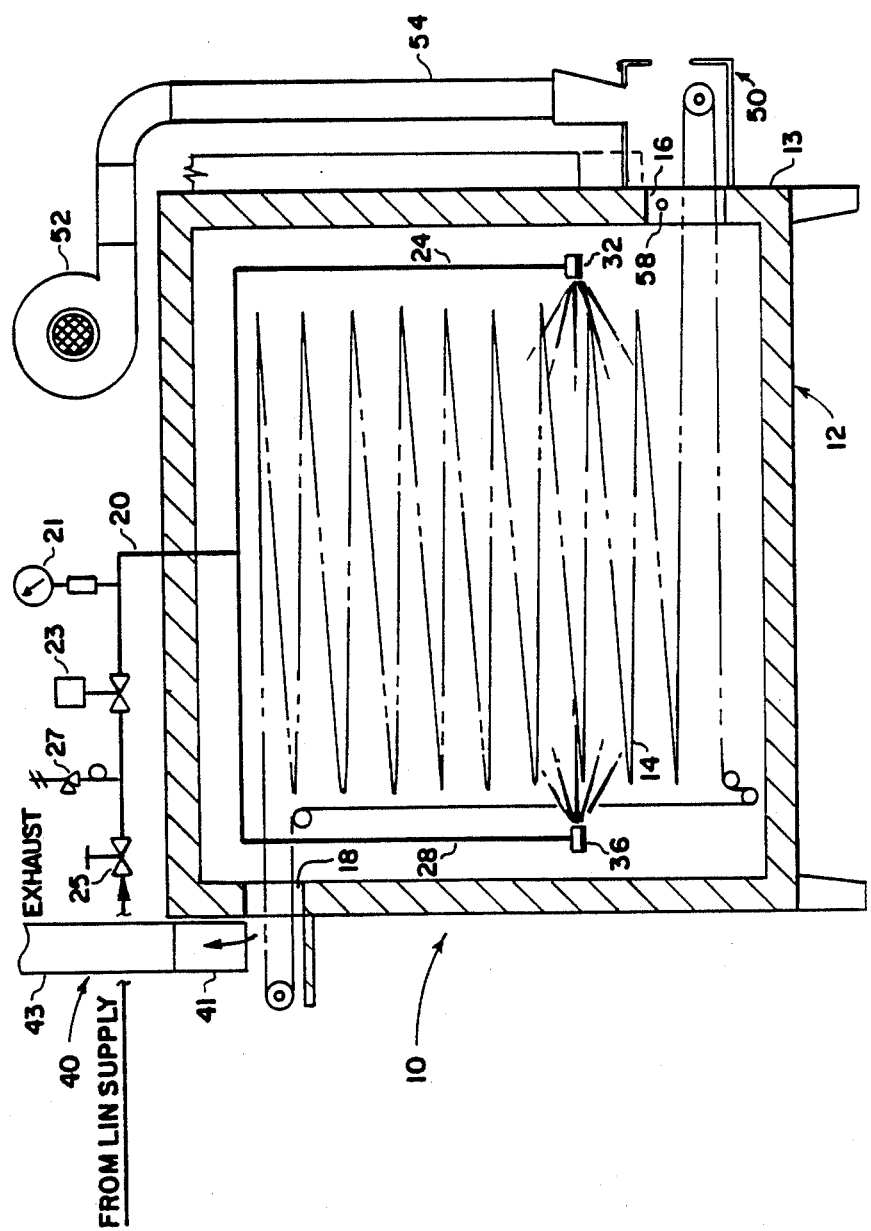
FIG. 2 is a view taken along the lines 2—2 of FIG. 1.

Spiral freezer 10 may employ either a mechanical refrigeration unit or utilize cryogenic fluid which is introduced via a conduit 20 from a source (not shown) to a plurality of branch conduits 22, 24, 26 and 28 disposed at 90° intervals around the central axis of cabinet 12 which in turn communicate with nozzles 30, 32 (FIG. 2), 34 and 36 disposed in a convenient location to provide a continuous spray of cryogen toward the recirculating fans (not shown) normally contained in a spiral freezer, so that the product moving through the freezer 10 is cooled and eventually frozen prior to discharge from the upper outlet 18. As shown in FIG. 2 the cryogen delivery system includes pressure gauge 21, automatic flow valve 23 and manual shut off valve 25 and pressure relief device 27 disposed between the branch conduits 22, 24, 26 and 28 in order to control conditions inside the cabinet 12.

When mechanical refrigeration is used, the insulated enclosure 12 is usually maintained at about −30° F. (−34° C.). However, when liquefied carbon dioxide ($LCO_2$) is used, the insulated enclosure is maintained at a much lower temperature, usually at −80° F. (−62° C.). One example of a liquefied carbon dioxide freezer is the KwikFreeze $CO_2$ freezer manufactured and sold by the Airco Industrial Gases Division of B.O.C. Group. The present invention applies to spiral freezers that utilize a cryogenic fluid as an expendable refrigerant. Cryogenic fluids that are suitable for this invention include, without limitation, liquefied carbon dioxide, liquefied nitrogen or liquefied air.

Freezer 10 normally includes an exhaust system 40 which is in the form of a collector 41 disposed adjacent the upper opening 18 of the freezer 10 which in turn is connected to an outside the building exhaust system via conduit 43 so that cryogen exiting the outlet of the freezer which, has been warmed as a result of heat exchange with the product being cooled, is exhausted away from the work area. This is necessary since cryogen such as liquid nitrogen and liquid carbon dioxide are sufficants and must be vented from the workplace.

A major problem with existing spiral cryogenic freezers is that since the liquefied cryogen is cold and dense, it drops to the bottom of the insulated chamber 12 and flows out of the lower opening 16. Not only is the loss of cryogen through the lower opening 16 uneconomical, it again is a source of suffucant to those in the area of the freezer. A single cage ascending spiral freezer contains only one spiral path for the conveyor belt. Thus, as a result, the conveyor will enter the insulated enclosure at an opening 16 near the bottom 13 and leave at an opening 18 near the top or roof 15 of freezer 10 providing a vertical distance between upper and lower openings. When the insulated enclosure 12 is at its operating temperature, the cold, dense gas inside the spiral freezer will spill out of the lower opening 16 causing a significant loss of refrigeration. For example, the density of carbon dioxide gas at −80° F. is 0.161 lb/ft$^3$ (2.58 kg/m$^3$), more than twice as dense as room air at 70° F. which has a density of 0.0749 lb/ft$^3$ (1.20 kg/m$^3$). In the case of liquefied nitrogen as the refrigerant, nitrogen gas at −80° F. has a density of 0.101 lb/ft$^3$ which is 34.8% more dense than 70° F. air. For an insulated freezer 10 having a height of 66¾" (1.69 meters) above opening 23" wide by 4" high (584 mm×102 mm) and containing nitrogen gas at −80° F., the flow of nitrogen gas out of the lower opening 16 is calculated to be 1840 lb/hr (835 Kg/hr). Thus, the patentees of the '623 patent attempted to solve this problem by using a series of baffles and a series of small recirculating fans disposed adjacent the inlet or lower opening of their freezer. However, patentees placed a thermocouple in a remote location of an exhaust system disposed adjacent the lower opening of the freezer which created problems because any cryogen escaping through the lower opening is diluted with large amounts of ambient atmosphere before it reaches the thermocouple, thus making a very narrow temperature range for control of the fans.

Another attempt to solve this problem, and one that has been employed with liquefied carbon dioxide spiral freezers, is to use an oversized exhaust fan with an exhaust hood disposed adjacent the lower opening of the freezer to prevent carbon dioxide gas from accumulating in the processing room. Thus, such an exhaust hood prevents the freezer operator from observing the loss of cold gas out of the freezer.

In order to solve the problem presented by the prior art, a pressure chamber 50 is disposed adjacent the lower opening 16 of the freezer 10 so that a variable feed fan or blower 52 driven by a suitable motor 53 and connected to suitable conduits 54 which in turn are connected to the pressure chamber 50 can utilize ambient atmosphere to cause a positive pressure inside of the chamber 50. Arrows 56 show the path of ambient atmosphere through the device of the invention. In the case where a freezer employing the invention is to be used to freeze food, a filter (not shown) is mounted on the inlet of fan or blower 52 to assure that airborne contaminants will not be delivered to the food product passing through the pressurizing chamber 50. The pressurizing fan 52 is operated at a sufficient speed to maintain the same pressure within the pressurizing chamber as exists within the insulated chamber 12 of the freezer 10 at the lower opening 16. The pressure within the chamber 12 varies and increases from top to bottom because of the hydrostatic head produced by the higher density of the cold gaseous cryogen.

As shown in FIG. 2, a temperature sensing device or thermocouple 58 is disposed within the lower opening 16 of the insulated chamber 12 of freezer 10. The thermocouple 58 is used to detect gas movement into (ingress) or out of (egress) the lower opening 16 of the freezer 10. If the temperature sensing device 58 senses gas movement out of the freezer by sensing a temperature approaching −80° F. (−62° C.), the temperature within the freezer, the speed of the fan 52 will be increased (either manually or preferably through an automatic control system) to increase the pressure inside the chamber 50 to thus prevent cold gas from spilling out of the freezer opening. Conversely, if the temperature sensor 58 detects ingress of ambient air at approximately 70° F. (21° C.), the speed of the fan 52 can be slowed down to decrease the pressure in chamber 50 to thus maintain a zero flow through the lower opening 16, i.e. neither ingress of ambient atmosphere nor egress of (contained refrigerated atmosphere) liquefied cryogen in relation to the insulated chamber 12.

For example, in a spiral freezer 10 having an insulated enclosure that has interior dimensions of 14'4" (4.37 m) by 14'4" (4.37 m) by 7'6" (2.29 m) high with a conveyor belt 21" (533 mm) wide and about 300' (91.4 m) long is used to process food at a production rate of 3300 lb/hr (1497 kg/hr) while removing heat at the rate of 132 BTU/lb (307 J/g) utilizing liquid nitrogen injected into the freezer at the rate of 3375 lb/hr (1531 kg/hr) the pressure within the spiral freezer at the lower opening 16 is calculated to be 0.038" water (9.4 Pa) which is balanced by providing 287 ft$^3$/min (0.121 m$^3$/sec) of pressurizing air in conduit 54. When the liquid nitrogen flow is reduced to 259 lb/hr (117 kg/hr) during a production interruption, the pressure within the freezer 10 decreases to 0.026" water (0.5 Pa) and is balanced by 238 ft³/min (0.112 m³/sec) pressurizing air in conduit 54.

The amount of pressurizing air that is required is established by sensing the temperature within the lower opening 16 as indicated above. If the cold gas spills out of the lower opening 16, the temperature will approach the temperature within the freezer 10, i.e. −80° F. (−62° C.). If the pressurizing air flows into the spiral freezer 10, the temperature will approach room temperature, i.e. 70° F. (21° C.). Thus, a zero flow condition through the lower opening 16 is achieved when the temperature within the lower opening approaches the arithmetic average of the spiral freezer temperature and the room temperature, i.e. −5° F. (−21° C.) based on the foregoing example.

Although the speed of rotation of the pressurizing fan 52 could be manually adjusted by an operator, a commercial system would incorporate an automatic control system to regulate the speed of the pressurizing fan. The temperature within the lower opening 16 will be sensed by a thermocouple placed as set out above and connected to a proportioning temperature controller (not shown) such as model 30210 manufactured and sold by Love Controls Corporation of Wheeling, Illinois. The output of the temperature controller would be in the nature of between 4 and 20 milliamperes D.C. and would be connected to an alternating current inverter such as Model AFC-2001-OB2 sold by T. B. Wood's Sons Company of Chambersburg, Pennsylvania. The alternating current inverter provides a variable frequency to the pressurizing fan 52 motor 53 to change the speed of rotation of the fan 52. The amount of pressurizing air delivered to the pressurizing chamber 50 increases as the fan speed increases.

Under conditions of automatic operation, when the temperature within the lower opening 16 is colder than the correct temperature, the pressurizing fan will increase its speed to deliver more pressurizing air. Conversely when the temperature within the lower opening is warmer than the correct temperature, the pressurizing flow will slow down to deliver less pressurizing air. Since the temperature controller has a proportional output, the pressurizing fan will run at a constant speed when conditions within the spiral freezer remain constant. When conditions within the spiral freezer change, the pressurizing fan will operate at a different speed to maintain a zero flow condition within the lower opening 16 of the freezer 10. The optimum performance is achieved when the cryogenic fluid is injected into the spiral freezer by a proportional, rather than an on-off system.

Having thus described my invention of what is desired to be secured by Letters Patent of the United States is set forth in the appended claims.

I claim:

1. A freezer of the type wherein a spiral conveyor is disposed within an insulated cabinet, said conveyor adapted to move in either direction between an upper opening and a lower opening in said insulated cabinet, said conveyor further adapted to move product to be frozen through said freezer with the product being exposed to refrigerated atmosphere within said freezer during its movement on the conveyor, the improvement comprising:

a chamber, including therein a variable speed fan, juxtaposed to the lower opening of the freezer to pressurize ambient atmosphere inside said chamber to provide a positive pressure outside said lower opening of said freezer to prevent ingress of ambient atmosphere into said freezer or egress of refrigerated atmosphere from the lower opening of said freezer; and a thermocouple located within the lower opening of said freezer said thermocouple adapted to detect temperature changes which indicate movement of ambient atmosphere into or refrigerated atmosphere out of said lower opening.

2. A freezer according to claim 1 wherein said thermocouple is connected to means connected to said variable speed fan to control the speed of rotation of said fan whereby changes in temperature sensed by said thermocouple are translated by said control means to vary the speed of rotation of said fan to have zero flow of refrigerated atmosphere out of or ambient atmosphere into said freezer.

3. A freezer according to claim 2 wherein said means connected to said variable speed fan includes said thermocouple, said thermocouple in turn is connected to a proportioning temperature controller which in turn is connected to an alternating current inverter which provides a variable frequency input to said variable speed fan.

4. A method for controlling the ingress of ambient atmosphere into or the egress of refrigerated atmosphere out of the lower opening of a spiral cryogenic freezer comrpising the steps of:
   (a) establishing a pressure chamber proximate the lower opening of said freezer;
   (b) pressurizing said pressure chamber with ambient atmosphere to establish zero flow of ambient atmosphere into or refrigerated atmosphere out of said lower opening;
   (c) sensing temperature within the lower opening of said freezer; and
   (d) utilizing changes in temperature sensed at said lower opening to change the pressure inside said pressure chamber to maintain zero flow through the lower opening of said freezer.

5. A method according to claim 4 wherein said pressure chamber is pressurized by means of a variable speed fan.

6. A method according to claim 4 wherein said spiral cryogenic freezer employs liquid nitrogen to produce the refrigerated atmosphere with said freezer.

7. A method according to claim 4 wherein said spiral cryogenic freezer employs liquid carbon dioxide to produce the refrigerated atmosphere with said freezer.

8. A method according to claim 4 wherein said spiral cryogenic freezer employs liquefied air to produce the refrigerated atmosphere with said freezer.

9. A freezer of the type wherein a spiral conveyor is disposed within an insulated cabinet, said conveyor adapted to move in either direction between an upper opening and a lower opening in said insulated cabinet, said conveyor further adapted to move product to be frozen through said freezer with the product being exposed to refrigerated atmosphere within said freezer during its movement on the conveyor, the improvement comprising:

means disposed adjacent the lower opening of the freezer to pressurize ambient atmosphere and provide a positive pressure outside said lower opening to prevent ingress of ambient atmosphere into said freezer or egress of refrigerated atmosphere from the lower opening of said freezer, said means being in the form of a chamber juxtaposed to said lower opening of said freezer, said chamber including a variable speed fan for producing pressurization of said chamber; and a temperature sensing device located within the lower opening of said freezer to detect movement of ambient atmosphere into or refrigerated atmosphere out of said lower opening.

10. A freezer according to claim 9 wherein said temperature sensing device is connected to means connected to said variable speed fan to control the speed of rotation of said fan whereby changes in temperature sensed by said temperature sensing device are translated by said control means to vary the speed of rotation of said fan to have zero flow of refrigerated atmosphere out of or ambient atmosphere into said freezer.

11. A freezer according to claim 10 wherein said means connected to said variable speed fan includes a thermocouple as said temperature sensing means, said thermocouple in turn is connected to a proportioning temperature controller which in turn is connected to an alternating current inverter which provides a variable frequency input to said variable speed fan.

* * * * *